US 7,818,706 B2

(12) United States Patent
Nakata

(10) Patent No.: US 7,818,706 B2
(45) Date of Patent: Oct. 19, 2010

(54) SEMICONDUCTOR INTEGRATED CIRCUIT DEVICE

(75) Inventor: Junichi Nakata, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 707 days.

(21) Appl. No.: 11/436,640

(22) Filed: May 19, 2006

(65) Prior Publication Data

US 2006/0261874 A1 Nov. 23, 2006

(30) Foreign Application Priority Data

May 20, 2005 (JP) ............................. 2005-148294

(51) Int. Cl.
*G06F 17/50* (2006.01)
*H03K 17/693* (2006.01)

(52) U.S. Cl. ................. 716/16; 716/17; 326/37; 326/41; 327/147; 327/295

(58) Field of Classification Search ............ 716/12–16, 716/9, 10, 178; 711/101; 327/147, 156, 327/295; 326/37–41
See application file for complete search history.

(56) References Cited

U.S. PATENT DOCUMENTS

| 5,790,839 | A |   | 8/1998  | Luk et al. |  |
|-----------|---|---|---------|------------|--|
| 5,898,636 | A |   | 4/1999  | Isomura et al. | |
| 5,999,386 | A | * | 12/1999 | Anderson et al. | 361/56 |
| 6,034,912 | A |   | 3/2000  | Isomura et al. | |
| 6,292,043 | B1 |  | 9/2001  | Shiraishi et al. | |
| 6,378,080 | B1 |  | 4/2002  | Anjo et al. | |
| 6,445,039 | B1 | * | 9/2002  | Woo et al. | 257/355 |
| 2002/0027461 | A1 |  | 3/2002  | Kusunoki | |
| 2003/0188088 | A1 | * | 10/2003 | Kootstra | 711/105 |
| 2004/0201405 | A1 | * | 10/2004 | Bacha et al. | 327/156 |
| 2006/0004968 | A1 | * | 1/2006  | Vogt | 711/154 |

FOREIGN PATENT DOCUMENTS

| JP | 7-78874      | 3/1995 |
| JP | 10-1089889   | 7/1998 |
| JP | 11-074465    | 3/1999 |
| JP | 2000-200114  | 7/2000 |
| JP | 2001-035923  | 2/2001 |
| JP | 2002-76127   | 3/2002 |

OTHER PUBLICATIONS

Tam et al., "Clock Generation and Distribution for the 130-nm Itanium® 2 Processor with 6-MB On-Die L3 Cache," IEEE Journal of Solid-State Circuits, vol. 39, No. 4, pp. 636-642 (Apr. 2004).
Japanese Patent Office issued a Japanese Office Action dated Dec. 1, 2008, Application No. 2005-148294.

* cited by examiner

*Primary Examiner*—Thuan Do
*Assistant Examiner*—Nha T Nguyen
(74) *Attorney, Agent, or Firm*—Young & Thompson

(57) ABSTRACT

Disclosed is a semiconductor integrated circuit device operated in stability by high-speed clock signals and which is high in a cell using rate and in interconnection efficiency. In a mid part of a chip, there are provided an I/O 11b, supplied with a clock signal from outside, and a PLL 12, connected to the I/O 11b, and adapted for routing an internal clock signal, generated on the basis of the clock signal, to DRAM macros 14. The PLL 12 generates the internal clock signal by multiplying the frequency of the clock signal. The internal clock signal generated is distributed via buffer 13 to each macro cell in need of the internal clock signal. Part of the DRAM macros may be replaced by logic macro cells.

12 Claims, 5 Drawing Sheets

SEMICONDUCTOR INTEGRATED CIRCUIT DEVICE

FIELD OF THE INVENTION

This invention relates to a semiconductor integrated circuit device. More particularly, this invention relates to a semiconductor integrated circuit device including a multiplicity of cells.

BACKGROUND OF THE INVENTION

As the LSI is increased in size, an LSI including a plural number of macro cells, as functional blocks, mounted on a sole chip, has now been placed on the market. As such LSI, there has been known such an LSI which has a DRAM (dynamic random access memory) macro cell(s) and a logic macro cell(s) integrated on the same chip (see Patent Document 1).

In Patent Document 1, there is described a device including a plural number of dynamic random access memory (DRAM) macros 114, arranged in upper and lower parts of a chip, and a logic macro 116, inclusive of a memory controller 115, arranged between the upper and lower macros, at a mid part of the chip, as shown in FIG. 5. In an off-center position between the upper and lower macros, there is provided a clock signal generating circuit, specifically a PLL (phase locked loop) 112. An internal clock signal from the PLL is routed to the mid part of the chip and buffered in a buffer 113. It is then fanned out through a metal conductor to drive the macros and a logic core without clock skew. Specifically, the internal clock signal is generated by the PLL 112 provided at a rim part of the chip. The internal clock signal from the PLL is routed to the mid part of the chip, using a metal wire of a larger thickness and a large width (main clock line), in order to minimize the resistance/capacitance (RC) delay. The internal clock signal is then buffered in the buffer 113 and fanned out via a balanced inverter tree and a clock wire to drive the DRAM macros 114 and the logic macro 116. Near the mid part of the chip is arranged the memory controller 115 controlling the DRAM macros 114. On the rim part of the chip is arranged an I/O 111 including a plural number of input circuits for routing a signal received from outside to the inner part of the LSI chip and a plural number of output circuits for outputting signals from the inside to the outer side of the chip. The input circuits and the output circuits are connected to associated external terminals, not shown, provided in the I/O 111. It is through this I/O 111 that the clock signal is supplied to the PLL 112.

As the relevant technique, there is disclosed in Patent Document 2 a semiconductor integrated circuit device which, in connection with layout designing for a high-speed cache SRAM or a high performance micro-processor, for example, may suitably be employed for automatic location or interconnection employing a floor plan of the internal IO system.

[Patent Document 1]
  JP Patent Kokai Publication No. JP-A-10-189889

[Patent Document 2]
  JP Patent Kokai Publication No. JP-A-11-74465

[Non-Patent Document 3]
  Simon Tam et al. "Clock Generation and Distribution for the 130-nm Itanium2 Processor with 6-MB On-Die L3 Cache", IEEE JOURNAL OF SOLID-STATE CIRCUITS. VOL. 39, NO. 4, APRIL 2004, pp. 636-642

SUMMARY OF THE DISCLOSURE

The disclosures of the above documents are herein incorporated with reference thereto.

In recent LSIs, including embedded memories, the operating speed is becoming higher, to the extent that an LSI is run with an internal clock signal of a high frequency exceeding 500 MHz. Moreover, the chip size is also increasing in keeping with the increasing capacity and with the increasing degree of hybridization. In case the inner cells of the large sized chip are run with a high-speed clock signal, there is a probability that, when the clock signal from the PLL 112 shown in Patent Document 1 is to be entered to the first buffer 113, the clock waveform is not propagated correctly. That is, there is fear that the conductor from the PLL 112 is increased in length and, due to the effect of the capacitance proper to the conductor, the clock waveform becomes dull with the result that the duty ratio deviates from a desired value. There are also cases that the jitter is generated under the effect of the noise from near-by conductors. However, with a DRAM in particular, deviation form the duty ratio of a clock signal or increase in jitter is detrimental to the high-speed operation. Although a buffer may be used preferentially for preventing the deviation of the duty ratio or the effect of jitter, the buffer, if used excessively, may lead to deterioration in the cell use ratio or in the interconnection efficiency.

Accordingly there is much to be desired in the art.

In one aspect, the present invention provides a semiconductor integrated circuit device including a plurality of macro cells in a chip, in which the semiconductor integrated circuit device comprises, in a mid part of the chip: a clock input terminal receiving a clock signal from outside, and a clock signal generating circuit that is connected to the clock input terminal and supplies internal clock signal, generated on the basis of the clock signal, to at least a fraction of the plural macro cells.

In a second aspect there is provided a semiconductor integrated circuit device in which a chip is divided into a plurality of areas each including a plurality of macro cells; the semiconductor integrated circuit device comprising, at a mid part of each area:

a clock input terminal receiving a clock signal from outside; and a clock signal generating circuit that is connected to the clock input terminal and supplies an internal clock signal, generated on the basis of the clock signal, to at least a fraction of the plural macro cells included in the area.

In a third aspect, the clock signal generating circuit multiplies the frequency of the clock signal to generate the internal clock signal.

In a fourth aspect, the fraction of the macro cells comprises macro cells for a RAM.

In a fifth aspect, the semiconductor integrated circuit device further comprises in a mid part of the chip:

a power supply terminal for supplying the power to the clock generating circuit and a grounding terminal.

In a sixth aspect, the semiconductor integrated circuit device further comprises in a mid part of the chip:

a circuit for protection against static charges between the power supply terminal and the grounding terminal on one hand and a power supply input end and a grounding input end of the clock signal generating circuit on the other hand.

In a seventh aspect, the semiconductor integrated circuit device further comprises, in a mid part of the chip:

a buffer provided between the clock input terminal and a clock signal input end of the clock signal generating circuit.

In an eighth aspect, a ring-shaped power supply conductor and a ring-shaped grounding conductor are arranged on a rim part of an area of the mid part of the chip, independently of a conductor to the power supply terminal and the grounding terminal; and the conductor connected to the power supply conductor and the conductor connected to the grounding conductor are disposed not to be present inwardly of the rim part.

In a ninth aspect, a ring-shaped power supply conductor and a ring-shaped grounding conductor are arranged on a rim part of an area of the mid part of the chip, independently of the wire to the power supply terminal and the grounding terminal; and a conductor connected to the power supply conductor and a conductor connected to the grounding conductor are disposed not to be present inwardly of the rim part.

In a tenth aspect, a ring-shaped power supply conductor and a ring-shaped grounding conductor are arranged on a rim part of an area of the mid part of the chip, independently of the wire to the power supply terminal and the grounding terminal; and a conductor connected to the power supply conductor and a conductor connected to the grounding conductor are disposed not to be present inwardly of the rim part.

The meritorious effects of the present invention are summarized as follows.

According to the present invention, there is provided a semiconductor integrated circuit device operated in stability with high-speed clock signals and having a high cell use ratio and high interconnection efficiency.

PREFERRED EMBODIMENTS OF THE INVENTION

Figure 1:
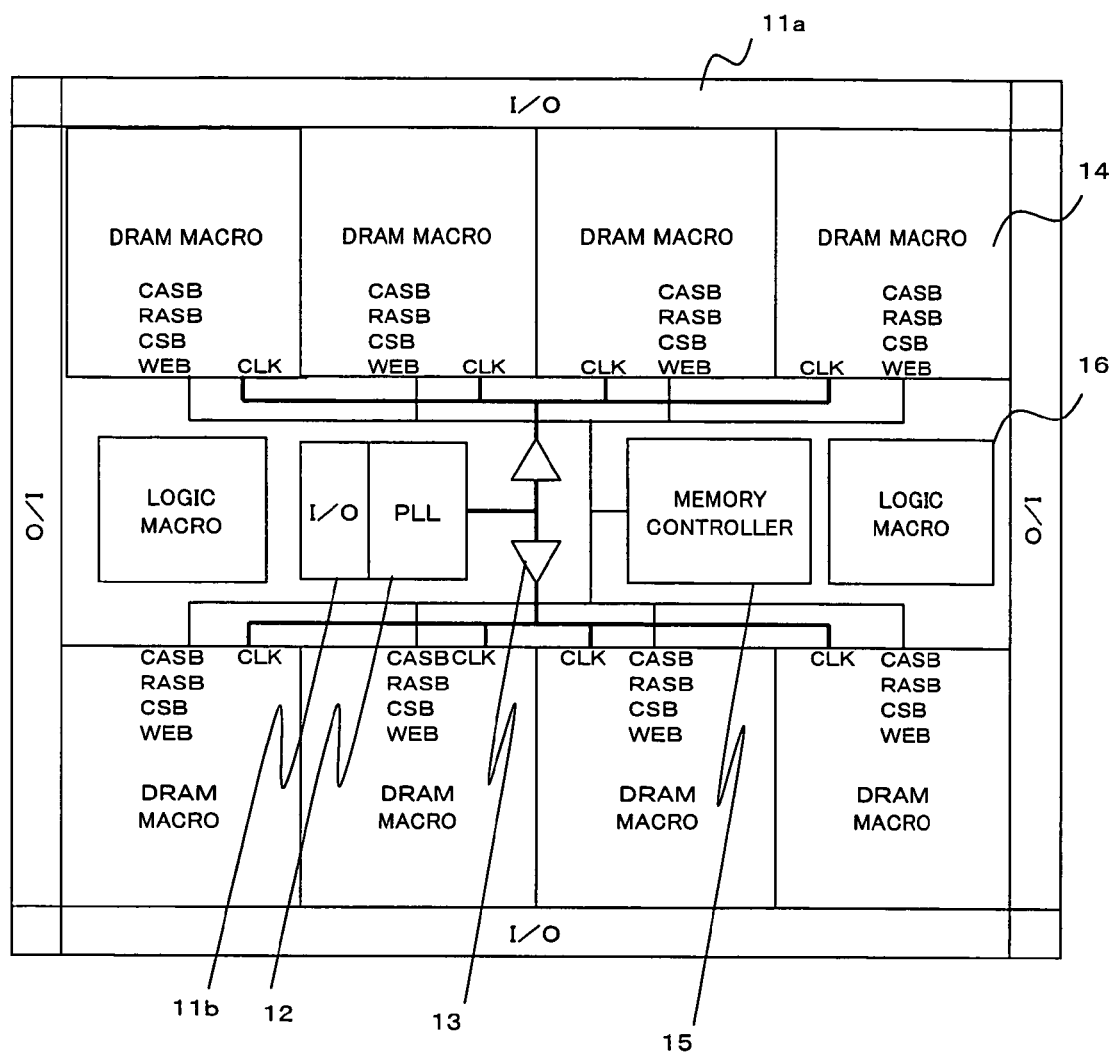
FIG. 1 is a diagram showing a layout of a semiconductor integrated circuit device according to a first embodiment of the present invention.

A semiconductor integrated circuit device, according to an embodiment of the present invention, includes a plural number of macro cells on a chip. At a mid part of the chip, there are provided a clock input terminal, receiving a clock signal from outside, and a clock signal generating circuit, connected to the clock input terminal and adapted for routing an internal clock signal, generated on the basis of the clock signal, to at least part of the plural macro cells. The clock signal generating circuit is formed by e.g. a PLL for multiplying the frequency of the clock signal to generate the internal clock signal. The internal clock signal, thus generated by the clock signal generating circuit, is input to the buffer as the signal travels a short length portion of the conductor path. The buffer distributes the internal clock signal to each macro cell in need of the internal clock signal, as it buffers the signal. It is noted that part of the macro cells may also be RAM macro cells, such as DRAM macro cells or SRAM macro cells. The present invention will now be described in detail with reference to the preferred embodiments thereof shown in the drawings.

First Embodiment

FIG. 1 shows the layout of a semiconductor integrated circuit device according to a first embodiment of the present invention. Referring to FIG. 1, there is arranged, on the rim part of an LSI chip, an I/O 11a including an input circuit for receiving signals from outside to the inside of the LSI chip and an output circuit for outputting signals from the inside of the chip to outside. The I/O is internally provided with connection terminals for connection to outside the chip, although these connection terminals are not shown. These connection terminals are provided in association with the input and output circuits. In a mid part of the chip, a PLL 12 is provided in proximity to an I/O 11b, and connected to the I/O 11b. The PLL 12 multiplies the frequency of the clock signal received from the I/O 11b to generate an internal clock signal. For example, the PLL generates an internal clock signal of a frequency of 500 MHz which is four times the frequency of 125 MHz of the clock signal. The so generated internal clock signal is buffered in a buffer 13 and thence routed to a clock terminal CLK of a DRAM macro 14 as an operating clock signal. Preferably, the conductor for the internal clock signal is branched in a manner as symmetrical as possible. In the embodiment shown in FIG. 1, upper four and lower four, totaling at eight, of the DRAM macros 14, are arrayed in proximity to the I/O on the rim part of the chip. A memory controller 15 routes a variety of control signals to a column address strobe signal terminal CASB, a row address strobe signal terminal RASB, a chip select signal terminal CSB and to a write enable signal terminal WEB of the DRAM macro 14. A logic macro 16 is a macro cell of a logic circuit having no direct relevance to the DRAM macro 14.

With the above-described semiconductor integrated circuit device, the I/O 11b, PLL 12 and the buffer 13 are arrayed in proximity to one another in a mid part of the chip. The internal clock signal of a higher frequency, such as 500 MHz, generated by the PLL 12, traverses a path of a short length to reach the buffer 13, where it is buffered. The internal clock signal is then distributed to each of the DRAM macros 14. Hence, the capacitance proper to the conductor between the PLL 12 and the buffer 13 is small, so that the clock waveform is not dulled under the effect of the capacitance proper to the conductor. The deviation form the desired value of the duty ratio is also small. Moreover, due to the short length of the interconnection, the clock signal is less susceptible to the adverse effect of the noise from the near-by interconnection, with the result that the probability of the jitter produced in the internal clock signal is reduced. That is, there is no necessity of preferentially using a buffer for reducing these adverse effects, thus achieving a semiconductor integrated circuit device having a high cell use ratio and high interconnection efficiency.

The above-mentioned embodiment shows a typical layout having eight DRAM macros 14, merely by way of illustration and not for restricting the present invention. Thus, in an embodiment shown in FIG. 2, a fraction of the DRAM macros 14, for example, the upper four DRAM macros 14, are replaced by logic macros 16a in need of operating clocks. It is also possible to use SRAM macros in place of the DRAM macros.

Second Embodiment

Figure 3:
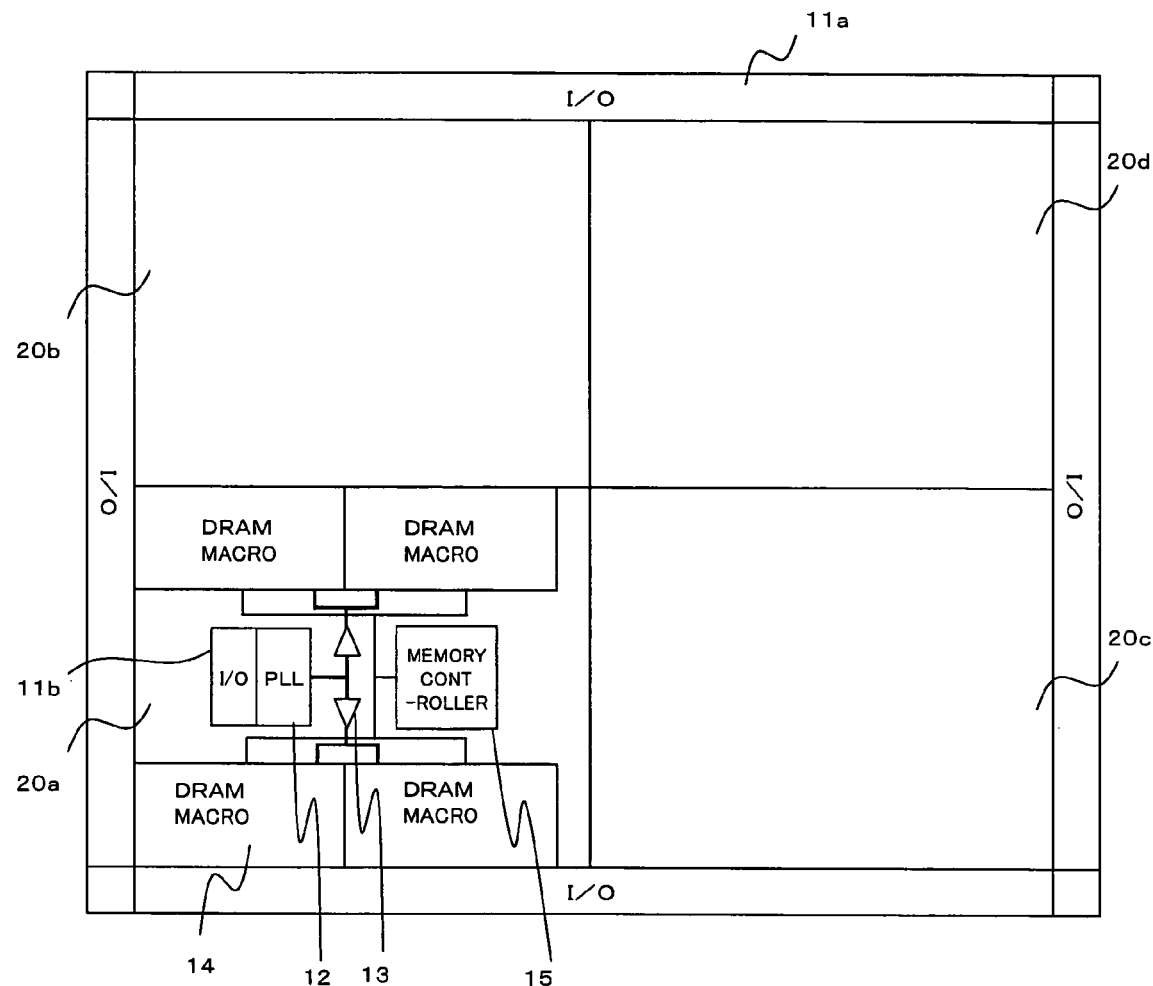
FIG. 3 is a diagram showing a layout of a semiconductor integrated circuit device according to a second embodiment of the present invention.

FIG. 3 shows the layout of a semiconductor integrated circuit device according to a second embodiment of the present invention. In FIG. 3, an I/O 11*a* is provided at the rim part of a chip. The inner part of the chip is divided into four areas 20*a* to 20*d*. In a mid part of each area, for example, the area 20*a*, there is provided an I/O 11*b* for receiving a clock signal from outside. The I/O is internally provided with an external connection terminal, not shown, connected to outside the chip. In a mid part of each area, a PLL 12 is provided in proximity to the I/O 11*b*, and is connected to the I/O 11*b*. The PLL 12 multiplies the frequency of the clock signal, supplied from the I/O 11*b*, to generate an internal clock signal. The so generated internal clock signal is buffered in a buffer 13 and thence routed to a clock terminal CLK of a DRAM macro 14. In the embodiment of FIG. 3, two upper and two lower, that is, a sum total of four, DRAM macros 14, are provided on the rim part of each area. A memory controller 15 routes a variety of control signals to different terminals, such as terminals CASB, RASB, CSB or WEB, of the DRAM macros 14. Other logic macros, not shown in FIG. 3, may suitably be arranged, if so desired. Although only the inner part of the area 20*a* is shown in FIG. 3 for ease in viewing the drawing, the other areas 20*b* to 20*d* are of a similar layout structure. Although the number of the areas is four in the embodiment of FIG. 3, this number is, of course, not limited to four, and may be any optional number.

In the above-described semiconductor integrated circuit device, the I/O 11*b*, PLL 12 and the buffer 13 are arrayed in proximity to one another in the mid part of each area. The internal clock signal of a high frequency, generated in the PLL 12, gets to the buffer 13 as it traverses a path of a short conductor length. The signal is buffered in the buffer and thence distributed to the DRAM macros 14. Hence, a semiconductor integrated circuit device of a high cell use ratio and high interconnection efficiency may be achieved, without the necessity of preferentially using a buffer.

Figure 2:
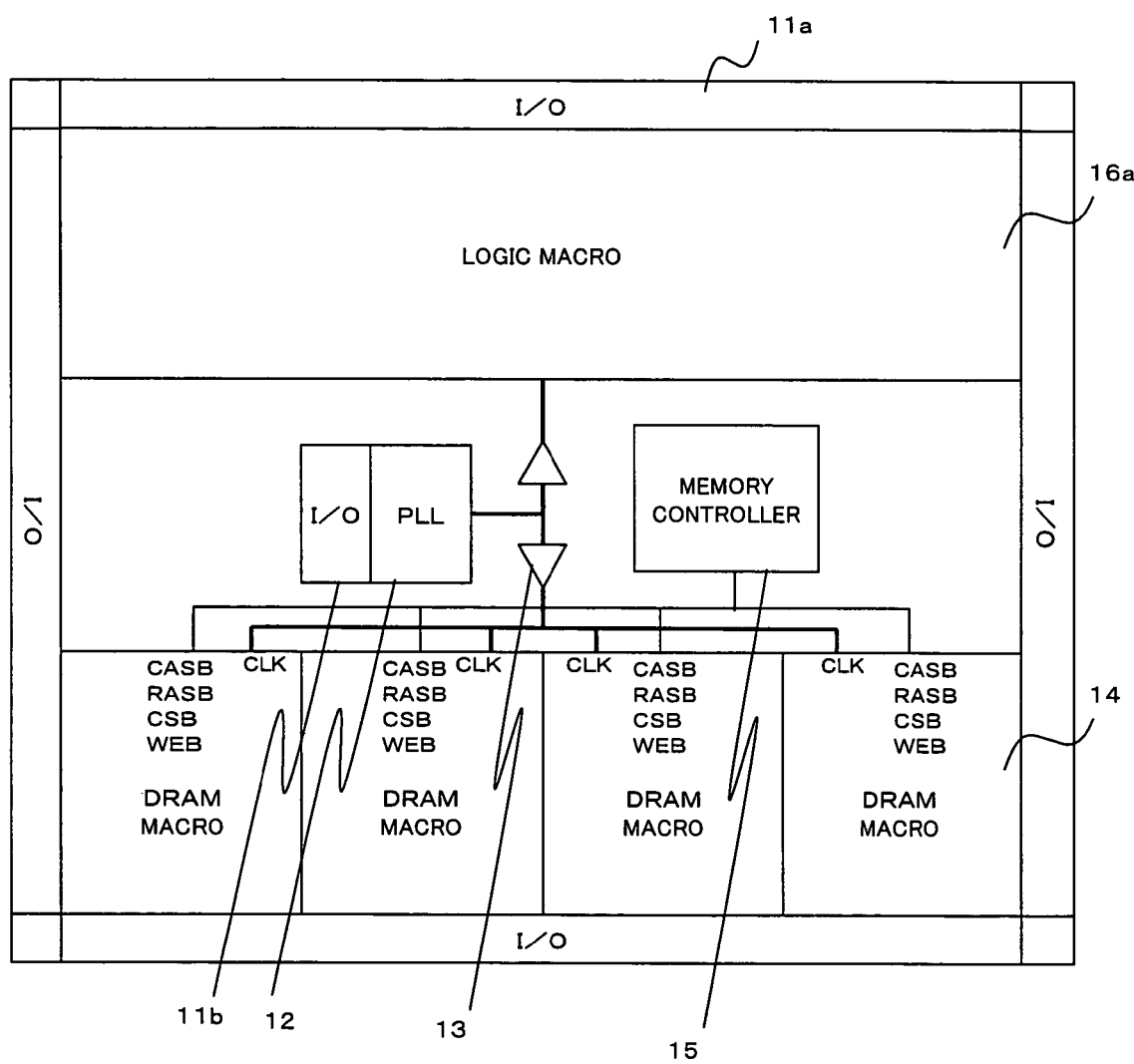
FIG. 2 is a diagram showing another layout of a semiconductor integrated circuit device according to the first embodiment of the present invention.

The mid part in the first and second embodiments will now be explained in more detail. The I/O 11*b*, PLL 12 and the buffer 13 are arrayed in proximity to one another in a mid part of an area in need of clock signals, that is, a clock distribution area, as shown in FIGS. 1 to 3. The mid part herein depicts an internal area surrounded by the I/O 11*a* on the rim part. In FIGS. 1 and 2, the mid part depicts an internal area surrounded by the DRAM macros 14, and an internal area surrounded by the logic macro 16*a* and by the DRAM macros 14, respectively. In FIG. 3, the mid part depicts an internal sub-area of each of the four areas which is surrounded by the DRAM macros 14. The clock distribution area is such an area where there are provided clock input terminals connected to all macros in need of clock signals, for example, the DRAM macros and the logic macro. The clock distribution area encompasses an area where there are provided clock input terminals for logic circuits or logic cells, in need of clock signals, in addition to the area where there are provided clock input terminals for the macros. It is most preferred that the coordinate of the center point of the clock distribution area or the coordinate of the center of gravity is present in an area where there are provided the I/O 11*b*, PLL 12 and the buffer 13. The reason is that, with such configuration, the clock signal may get to the buffer 13, so as to be buffered therein and distributed to the DRAM macros 14, as the clock signal traverses a short interconnection path. By so doing, the length of the clock distribution tree from the base point of clock distribution to the target (terminal point) of clock distribution may be made shorter to diminish the delay time.

Figure 4:
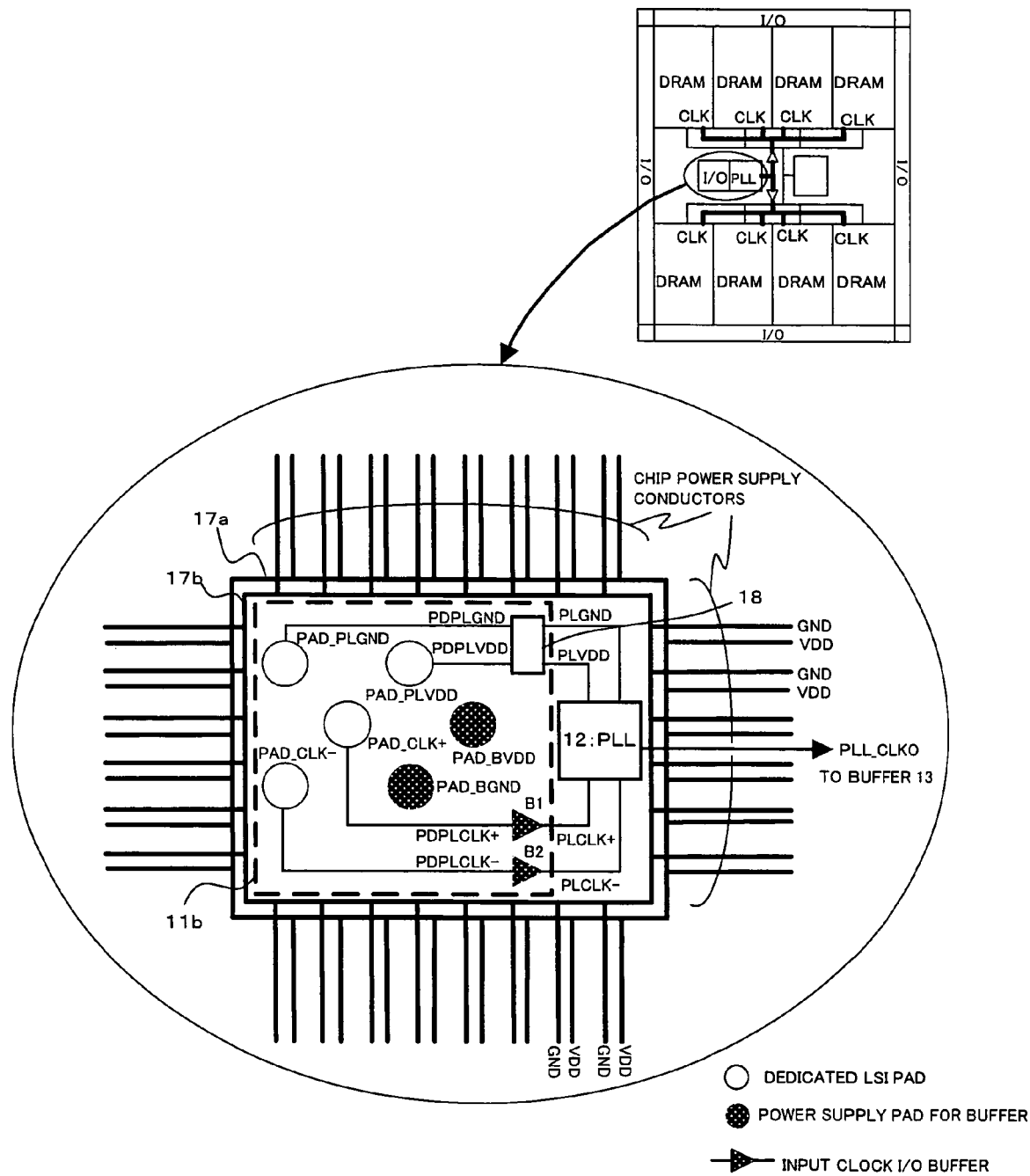
FIG. 4 is a diagram showing an example of a detailed layout of the mid part of the chip.
Figure 5:
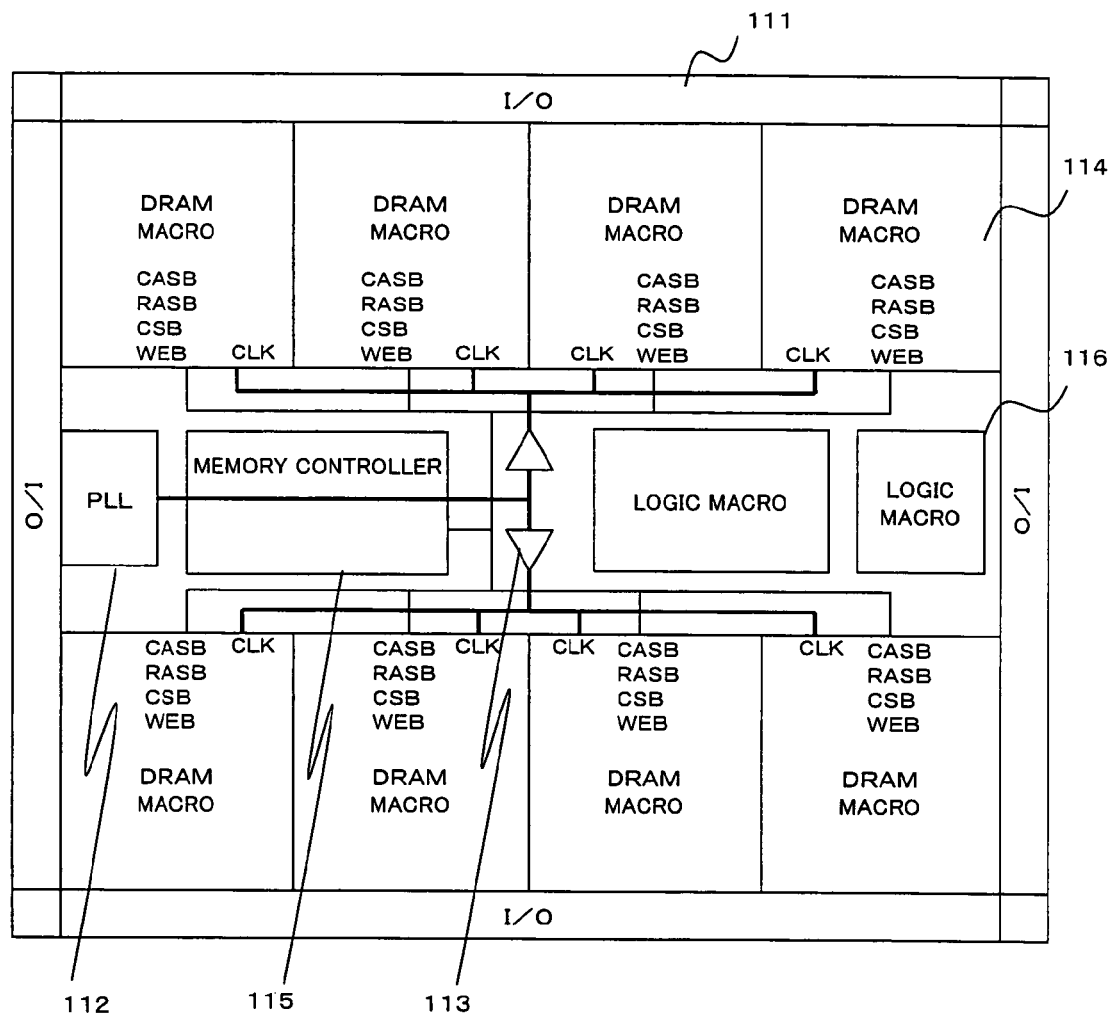
FIG. 5 is a diagram showing a layout of a conventional semiconductor integrated circuit device.

FIG. 4 schematically shows an example of a detailed layout of the mid part of the chip. In FIG. 4, the I/O 11*b* and the PLL 12 are arranged at a mid part of the chip. There are also provided power supply pads PAD_PLVDD and PAD_PLGND, for power exclusively supplied to the power supply end and to the ground end of the PLL 12, respectively. There are also provided a pad for supplying a positive phase clock signal PAD_CLK+ and a pad for supplying a negative phase clock signal PAD_CLK−. There are furthermore provided pads PAD_BVDD and PAD_BGND, connected to the power supply and to the ground of the buffer 13, respectively, buffers B1, B2 for input clock I/O, and a power supply protection circuit 18. The power supply protection circuit 18 is a circuit for protection of the power supply for the PLL 12 against static charges. It is noted that connection for the pads PAD_PLVDD, PAD_PLGND, PAD_CLK+, PAD_CLK−, PAD_BVDD, PAD_BGND, buffers B1, B2 and the power supply protection circuit 18 is provided at the time of producing the LSI.

The PLL power supply line PDPLVDD and PLL grounding lines PDPLGND are connected to the pads PAD_PLVDD and PAD_PLGND, and thence connected to the PLL 12, via power supply protection circuit 18, as PLL power supply conductor PLVDD and as PLL grounding conductor PLGND, respectively. On the other hand, the conductors PDPLCLK+ and PDPLCLK− are connected to the pads PAD_CLK+ and PAD_CLK−, respectively, and thence connected to the PLL 12, via buffers B1, B2, as conductors PLCLK+ and PLCLK− for clock signals, respectively, to supply positive phase and negative phase clock signals, respectively. Meanwhile, the conductors from the pads PAD_BVDD and PAD_BGND to the buffers B1,B2 are not shown for simplicity.

A VDD circumscribing ring 17*a* and a GND circumscribing ring 17*b*, which are ring-shaped conductors, are provided as ordinary conductors for power supply to a chip (VDD and GND) on the outer rim of the area forming the mid part of the chip. The conductors connected to the VDD circumscribing ring 17*a* and the GND circumscribing ring 17*b* are adapted not to be present in the inside of the circumscribing rings. As for the interconnection for the ordinary power supply for a chip, transverse conductors and vertical conductors are arrayed in odd and even layers, respectively. In a given interconnection layer, The GND conductors and VDD conductors are arrayed in alternation with each other.

Inwardly of these circumscribing rings, the power supply pads PAD_PLVDD and PAD_PLGND, PAD_CLK+ and PAD_CLK−, PAD_BVDD and PAD_BGND, buffers B1, B2, power supply protection circuit 18, PLL 12, PLL power supply line PDPLVDD, PLL grounding line PDPLGND, PLL power supply conductor PLVDD, PLL grounding line PLGND, conductor PDPLCLK+, PDPLCLK−, PLCLK+ and PLCLK−, are laid. To the IO 11*b* may be connected an ordinary power supply conductor for a chip, PLL power supply conductor PLVDD and the PLL grounding conductor PLGND. For ease in manufacture, the PLL power supply line PLVDD and the PLL grounding conductor PLGND may also be connected to the I/O 11*b*.

In FIG. 4, the pads PAD_PLVDD, PAD_PLGND, PAD_CLK+, PAD_CLK−, PAD_BVDD and PAD_BGND are laid on a lateral side of the PLL 12. Alternatively, part or all of these pads may be laid vertically above the PLL 12.

With the above configuration of the mid part of the chip, the conductor PLVDD as the power supply line and the conductor PLGND as the grounding line for the PLL 12 are separated from the routine power supply line and the grounding line (VDD, GND) provided in the chip. In addition, the power supply protection circuit 18 is arranged close to the PLL 12, so that the power supply conductor is reduced in length. Hence, the stabilized power may be supplied to the PLL 12 without being affected by the IR drop or by fluctuations in the power supply of the chip as in a conventional system. Furthermore, the lengths of the conductors PLCLK+ and PLCLK− of the differential clock signals, entered from the buffers B1 and B2 to the PLL 12, may more readily be equated to each other to reduce the delay time difference to an extremely small value.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A semiconductor integrated circuit device including a plurality of macro cells in a chip, said semiconductor integrated circuit device comprising:
    a VDD ring-shaped conductor;
    a GND ring-shaped conductor, wherein the VDD and GND ring-shaped conductors are electrically connected to VDD and GND connections of the macro cells that lie outside the VDD and GND ring-shaped conductors, and wherein the GND and VDD ring-shaped conductors define as a mid part of the chip a portion of the chip that lies inside both the GND and VDD ring-shaped conductors;
    a clock input terminal in the mid part of the chip constructed and arranged to receive a clock signal from outside of the device; and
    a clock signal generating circuit in the mid part of the chip that is electrically connected to said clock input terminal, the clock signal generating circuit being constructed and arranged to supply an internal clock signal, based on said clock signal, to at least a fraction of said plural macro cells that lie outside of the GND and VDD ring-shaped conductors.

2. The semiconductor integrated circuit device of claim 1, wherein the chip is divided into a plurality of areas, each said area comprising at least one of:
    said macro cells,
    said clock input terminal; and
    said clock signal generating circuit.

3. The semiconductor integrated circuit device according to claim 2 wherein said clock signal generating circuit multiplies the frequency of said clock signal to generate said internal clock signal.

4. The semiconductor integrated circuit device according to claim 2 wherein said fraction of said macro cells comprises macro cells for a RAM.

5. The semiconductor integrated circuit device according to claim 2 further comprising, in a each of the mid parts of said areas:
    a power supply terminal electrically connected so as to supply power to said clock generating circuit; and
    a grounding terminal;
    wherein the power supply terminal and grounding terminal disposed in the mid part of the area are electrically separated from the VDD and GND ring-shaped conductors.

6. The semiconductor integrated circuit device according to claim 5 further comprising, in the mid part of said area:
    a circuit for protection against static charges between said power supply terminal and the grounding terminal, and protection against static charges between a power supply input end and a grounding input end of said clock signal generating circuit.

7. The semiconductor integrated circuit device according to claim 2 further comprising, in the mid part of said area:
    a buffer provided between said clock input terminal and a clock signal input end of said clock signal generating circuit.

8. The semiconductor integrated circuit device according to claim 1 wherein said clock signal generating circuit multiplies a frequency of said clock signal to generate said internal clock signal.

9. The semiconductor integrated circuit device according to claim 1 wherein said fraction of said macro cells comprises macro cells for a RAM.

10. The semiconductor integrated circuit device according to claim 1 further comprising, in the mid part of said chip:
    a power supply terminal electrically connected so as to supply power to said clock generating circuit; and
    a grounding terminal;
    wherein the power supply terminal and grounding terminal disposed in the mid part of the chip are electrically separated from the VDD and GND ring-shaped conductors.

11. The semiconductor integrated circuit device according to claim 10 further comprising, in the mid part of said chip:
    a circuit for protection against static charges between said power supply terminal and the grounding terminal, and protection against static charges between a power supply input end and a grounding input end of said clock signal generating circuit.

12. The semiconductor integrated circuit device according to claim 1 further comprising, in the mid part of said chip:
    a buffer provided between said clock input terminal and a clock signal input end of said clock signal generating circuit.

* * * * *